United States Patent [19]
Galpin et al.

[11] Patent Number: 5,626,157
[45] Date of Patent: May 6, 1997

[54] OPTICAL TABLE

[75] Inventors: John D. Galpin; Valerie J. Galpin, both of Cardinal's Green, England

[73] Assignee: Melles Griot, Inc., Irvine, Calif.

[21] Appl. No.: 370,263

[22] Filed: Jan. 9, 1995

Related U.S. Application Data

[60] Division of Ser. No. 58,769, Apr. 29, 1993, Pat. No. 5,402,734, which is a continuation-in-part of Ser. No. 989,107, Dec. 11, 1992, abandoned.

[51] Int. Cl.⁶ .................................. B08B 3/02
[52] U.S. Cl. .................. 134/115 R; 134/166 R; 134/104.1; 15/302; 15/321
[58] Field of Search .............. 134/115 R, 104.1, 134/166 R; 15/104, 302, 321

[56] References Cited

U.S. PATENT DOCUMENTS

| | | | |
|---|---|---|---|
| 1,583,657 | 10/1926 | Chapman | 134/115 R |
| 1,769,165 | 7/1930 | Rhoades et al. | 134/115 R |
| 1,952,568 | 3/1934 | Schapp et al. | 134/115 R |
| 2,045,890 | 6/1936 | Whalt et al. | 134/115 R |
| 2,750,611 | 6/1956 | Chatel | 134/115 R |
| 2,782,426 | 2/1957 | Townsend | 134/115 R |
| 2,896,643 | 9/1959 | Ottoson | 15/302 |
| 2,971,519 | 2/1961 | Willson | 134/115 R |
| 3,104,194 | 9/1963 | Zahorski . | |
| 3,152,599 | 10/1964 | Grimes | 134/153 |
| 3,157,904 | 11/1964 | Flodel | 134/115 R |
| 4,241,192 | 12/1980 | Morris . | |
| 4,274,885 | 6/1981 | Swartout | 15/304 |
| 4,341,568 | 7/1982 | Christensen | 15/304 |
| 4,370,372 | 1/1983 | Higgins et al. . | |
| 4,559,664 | 12/1985 | Bohme et al. | 15/302 |
| 4,621,006 | 11/1986 | Terry et al. . | |
| 4,645,171 | 2/1987 | Heide . | |
| 4,685,480 | 8/1987 | Eck | 15/302 |
| 4,733,428 | 3/1988 | Malinge et al. | 15/302 |
| 4,853,065 | 8/1989 | Terry et al. . | |
| 5,021,282 | 6/1991 | Terry et al. . | |
| 5,061,541 | 10/1991 | Gertel . | |

FOREIGN PATENT DOCUMENTS 2519270  12/1981  France .

OTHER PUBLICATIONS

Kinetic Systems, Vibraplane Optical Tables brochure.

*Primary Examiner*—Frankie L. Stinson
*Attorney, Agent, or Firm*—Knobbe, Martens, Olson & Bear, LLP

[57] ABSTRACT

A honeycomb tabletop, including a honeycomb core positioned between a top and bottom structural layer, wherein a number of cups are positioned between the bottom layer and the top layer, and at least some of the number of cups are sized and shaped to cooperate with the lower face of the top layer to form a cavity surrounding at least two of the plurality of holes in the top layer so that contaminants will be unable to pass through the surrounded holes into the honeycomb core. Preferably, these cups form a sealing engagement with the lower face of the top layer to facilitate rapid and thorough cleaning of contaminants from the cups.

8 Claims, 8 Drawing Sheets

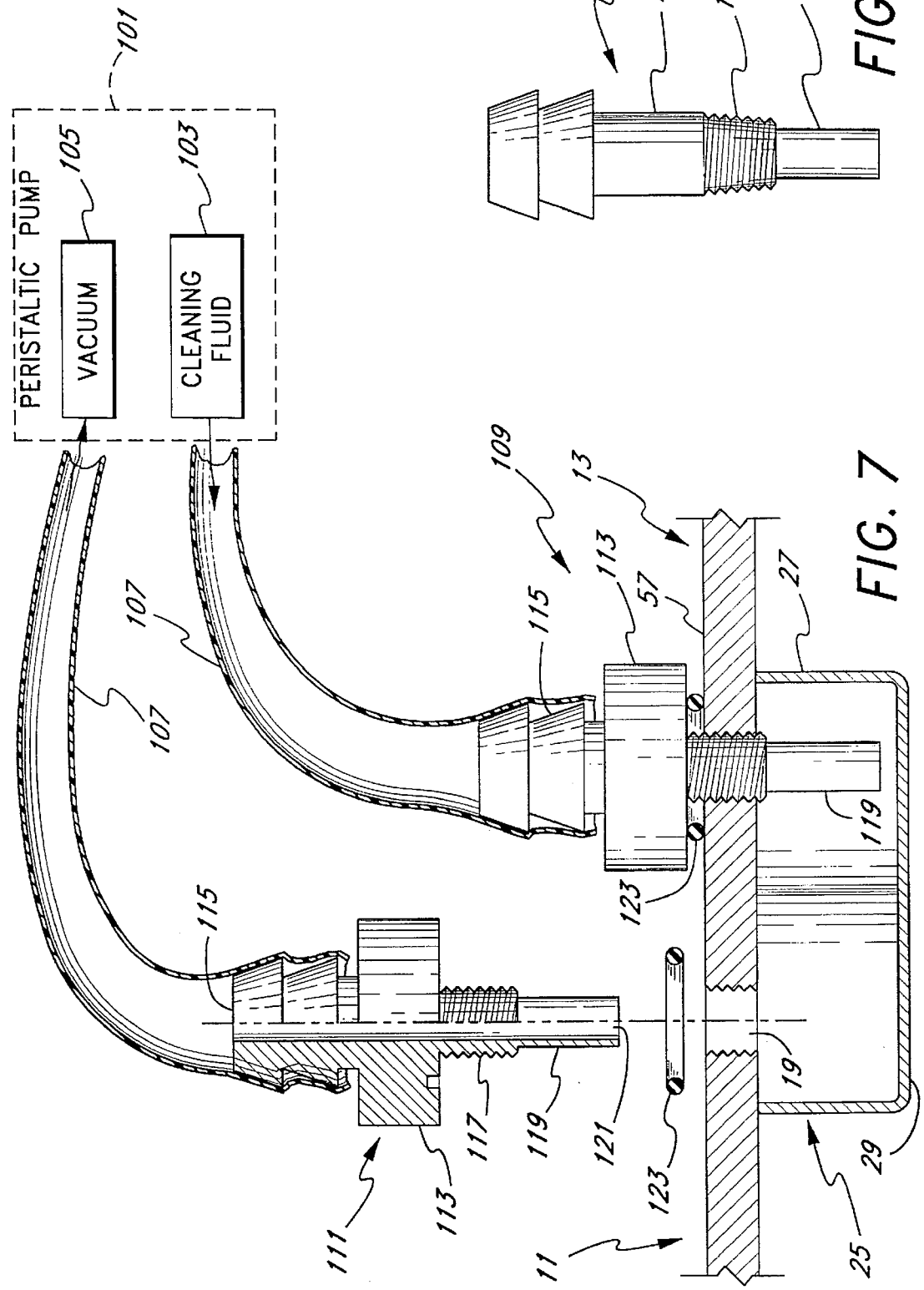

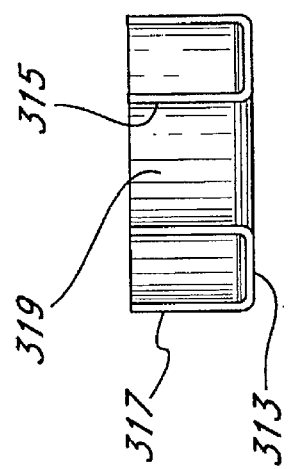
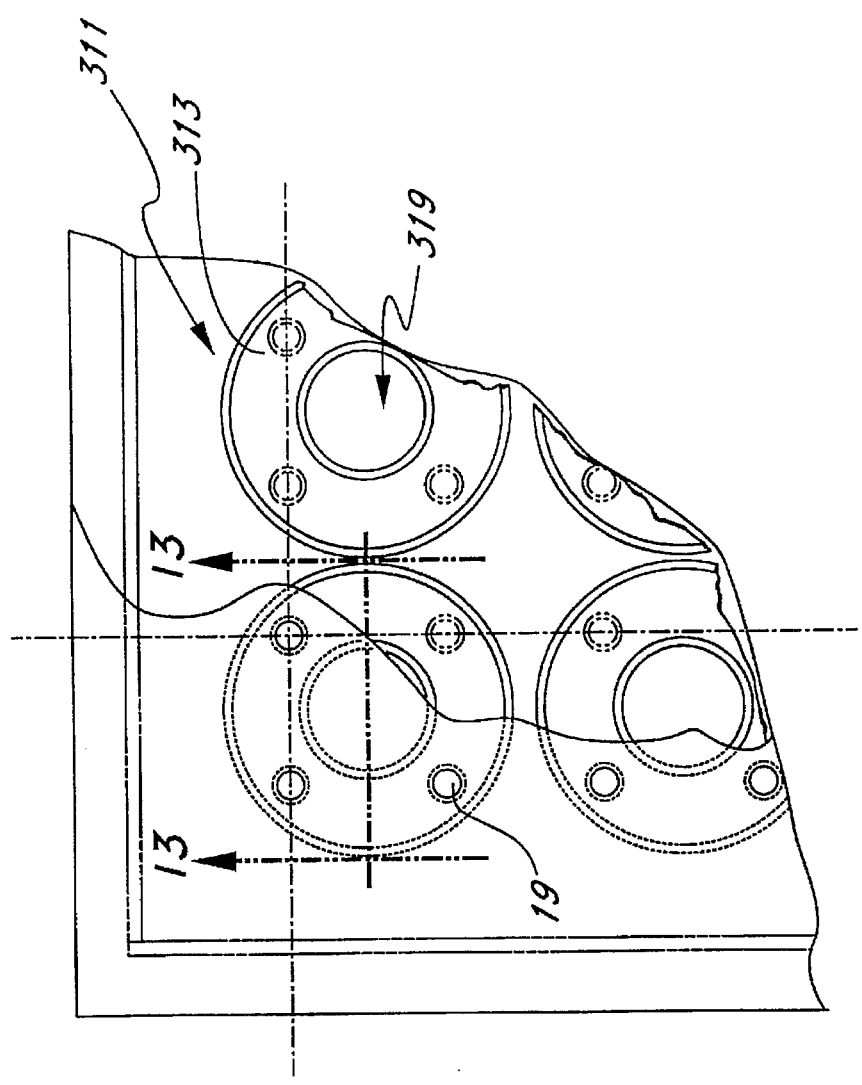

OPTICAL TABLE

RELATED APPLICATION

This application is a division of application Ser. No. 08/058,769,filed Apr. 29, 1993 now U.S. Pat. No. 5,402,734, which is a continuation-in-part of application Ser. No. 07/989,107, filed Dec. 11, 1992 abandoned.

BACKGROUND OF THE INVENTION

The subject invention relates to optical tables, and particularly to honeycomb tabletops for optical tables.

Honeycomb tabletops are typically used for supporting and positioning highly sensitive scientific equipment such as optical devices. The tabletop generally includes an upper layer, a lower layer and a honeycomb core. The upper layer is typically provided with a plurality of tapped holes which are used for securing equipment to the tabletop surface. The honeycomb core maintains the structural rigidity and flatness of the upper layer, despite the numerous holes drilled therein. In the past, granite plates and slabs were often used in this setting. However, due to the great weight of the slabs and the difficulty in securing components to such surfaces, honeycomb tabletops have grown increasingly popular.

Unfortunately, existing honeycomb tabletops are not without their drawbacks. Specifically, the tapped holes provide openings through which liquid or other debris spilled upon the table surface may pass into the interior. Due to the depth of the tabletop, such spills are difficult or impractical to clean.

A number of attempts have been made to develop a design to address these problems. Specifically, U.S. Pat. No. 4,621,006 to Terry, et al. discloses a tabletop design in which an intermediate sheet is positioned between a relatively deep honeycomb core portion adjoining the lower layer of the table and a relatively thin honeycomb portion adjoining the upper layer. Terry teaches that the longer cells of the lower honeycomb section are completely sealed off so that only the shallow cells of the smaller honeycomb section need be cleaned. U.S. Pat. No. 4,645,171 to Heide discloses a honeycomb tabletop in which "cavity enclosures" are secured, such as by welding, to the interior surface of the upper layer, apparently coaxially aligned with the holes of the upper layer. The holes and enclosures are then positioned with respect to the honeycomb core such that the enclosures are situated substantially within the middle of the honeycomb cells. Heidi teaches that the enclosures have a closed bottom portion which prevents any liquid or other contaminant from entering the interior portion of the table, and that the table may be cleaned by "simply wiping the table surface clean and applying suction to remove the spillage from the cavities." In contrast, U.S. Pat. No. 4,853,065 discloses the use of a sealing sheet that incorporates rows and columns of projections which may be aligned with the internal cells of a table's honeycomb core to provide a means of sealing the holes of the upper layer from the honeycomb core.

Yet another honeycomb tabletop design is disclosed in French Patent No. 2,519,270, in which a series of sleeves are positioned coaxially aligned beneath each of the individual holes of the upper layer. The bottom portion of these sleeves rests upon an interconnecting plate, which in turn rests upon a honeycomb stiffening structure, which in turn rests upon a lower layer. The sleeves prevent the honeycomb stiffening structure from coming into contact with objects, dust or liquids accidentally entering through holes of the upper layer.

SUMMARY OF THE INVENTION

Despite varying levels of effectiveness in isolating the honeycomb core from residue or contaminants entering the tabletop through the plurality of holes in the upper layer, no existing design appears to adequately address the need for easy and thorough cleaning of the portion of the tabletop exposed to the tapped holes. Accordingly, one aspect of the invention is an optical table comprising a plurality of debris retention structures sealed to a top layer and forming respective plurality of cavities for containing debris. In the preferred embodiment, the debris retention structures have a maximum dimension, in a plane parallel to a face of the top layer, which is substantially less than either the length or width of the top layer. At least some of the plurality of debris retention structures are sized and shaped such that each of their respective cavities provide fluid communication between a selected number of plurality of holes while being sealed from fluid communication with the remainder of the plurality of holes, the selected number being at least two. Preferably, the debris retention structures are distributed beneath the top layer such that a first plurality of these structures extend across the top layer in a direction parallel to a side of the top layer, and a second plurality of these structures extend across the top layer in an orthogonal direction. Additionally, in one embodiment, the debris retention structures have a periphery with a length that is substantially less than the length of any side of the top layer.

Another aspect of the invention is a method of cleaning contaminants from an optical table having a top layer for retaining scientific devices, said top layer including a plurality of holes for securing said devices to said top layer, a bottom structural layer, a honeycomb core positioned between the bottom layer and the top layer, including the steps of introducing cleaning fluid into at least one of the holes and removing the contaminants by evacuating the cleaning fluid, through at least one other of the holes.

Another aspect of the invention is a method of cleaning a honeycomb tabletop, including a honeycomb core positioned between a bottom layer and a top layer, and a number of debris retention structures, such as cups, sized and shaped to cooperate with the lower face of the top layer to form a cavity surrounding at least two of a plurality of holes in the top layer so that contaminants will be unable to pass through the surrounded holes into the honeycomb core, including connecting a source of suction to at least one of the holes surrounded by the cavity, connecting a source of cleaning fluid to at least one other of the holes surrounded by the cavity, introducing cleaning fluid into the cavity from a source of cleaning fluid, and evacuating cleaning fluid and contaminants from the cavity through the other hole(s). In a preferred embodiment, the introducing of cleaning fluid and evacuating of cleaning fluid occurs simultaneously.

Another aspect of the invention is a honeycomb tabletop, including a honeycomb core positioned between a bottom layer and an intermediate layer, and a number of cups positioned between the intermediate layer and a top layer. The top layer defines a plurality of holes for securing scientific devices to the top layer, and the cups are sized and shaped to cooperate with the lower face of the top layer to form a cavity surrounding at least two of the holes in the top layer so that contaminants will be unable to pass through the holes into the honeycomb core. Preferably, the cups structurally support the top layer and form a sealing engagement with the lower face of the top layer to facilitate rapid and thorough cleaning of contaminants from the cups. Further, the intermediate layer advantageously defines a number of openings, permitting the equalization of pressure between the core and the space surrounding the cups adjacent the upper layer.

In view of the vast number of holes in a table, typically between 3,000 and 7,000 for larger tables, it may also prove desirable in situations of larger spills to utilize a cleaning manifold. Such a manifold may utilize a multitude of pairs of input and exit nozzles connected to sources of cleaning fluid and vacuum, respectively. This manifold could be forcefully clamped to the tabletop with its individual ports sealed to individual tapped holes, for example, by means of O-rings. Alternatively, the manifold could be clamped and sealed by use of a plurality of threaded screw adapters passing through the manifold by means of suitable seals sealed to that manifold. The manifold in turn can be clamped to the table by the same threaded adapters and locally sealed, for example, by one or more O-rings.

For convenience, the inlet manifold and the evacuation manifold might be joined together to form a single body having two manifold cavities, one for input fluid and one for extraction, having main input and output ports connected to appropriate tubing for the supplier to discharge a fluid, or directly to pumps for compression or suction.

BRIEF DESCRIPTION OF THE DRAWINGS

FIG. 7 is a partially schematic sectional view of a cleaning system for use with the tabletop of FIG. 1;

FIG. 7a is an alternative embodiment of an adapter for the cleaning system illustrated in FIG. 7;

FIG. 12 is a plan view of an alternate embodiment of a pair of cups for use with the tabletop of FIG. 1, showing the position of the holes of the table in phantom; and FIG. 13 is a sectional view along 13—13 of one of the cups of FIG. 12.

DETAILED DESCRIPTION OF THE PREFERRED EMBODIMENT

Figure 1:
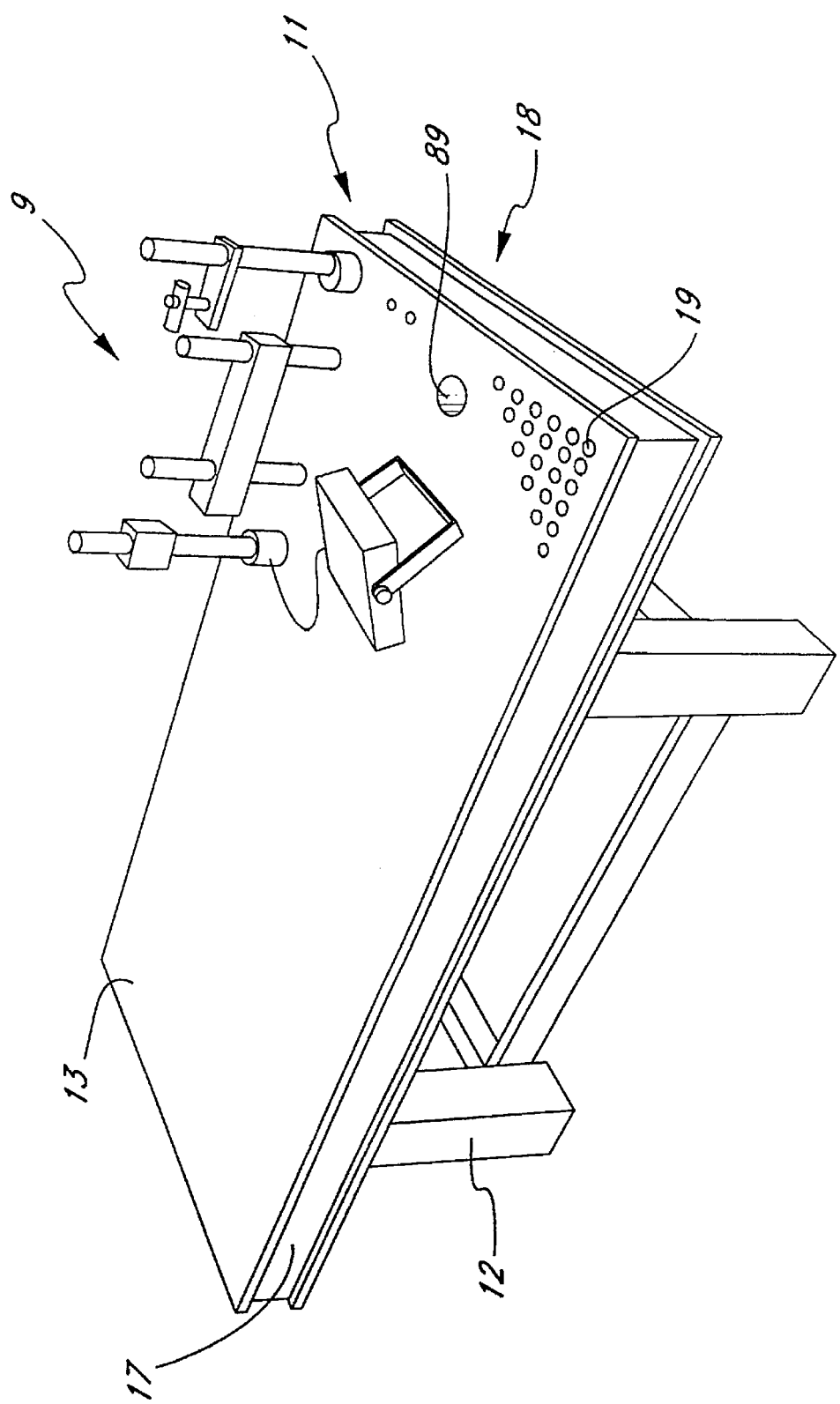
FIG. 1 is a perspective view of a vibration isolation table with a honeycomb tabletop.

FIG. 1 illustrates a vibration isolation table 9 used to support laboratory equipment. The table consists of a rigid honeycomb tabletop 11 and a supporting vibration isolation system 12.

Figure 2:
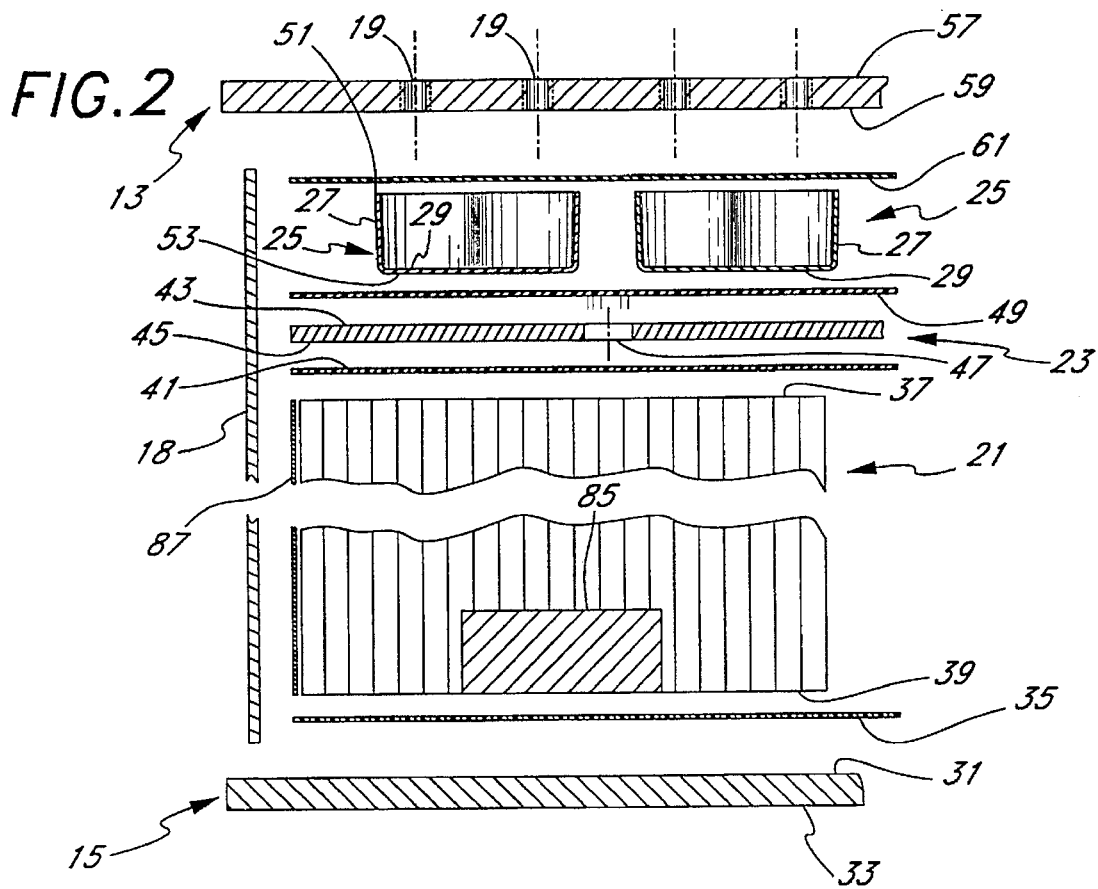
FIG. 2 is an exploded sectional view of the tabletop of FIG. 1.
Figure 2A:
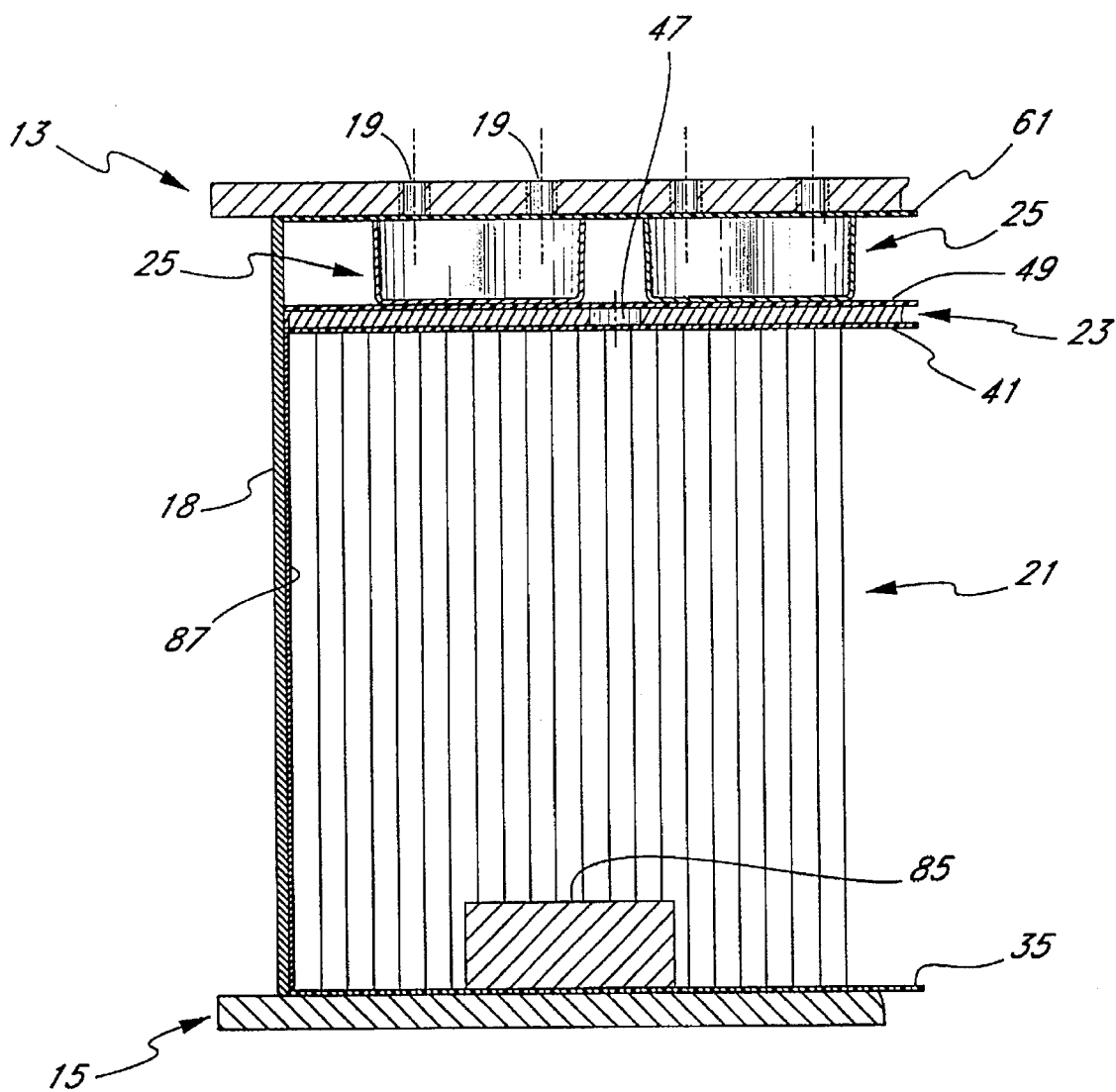
FIG. 2a is an assembled sectional view of the tabletop of FIG. 1.

Referring to FIGS. 1–2 and 2A, the generally rectangular tabletop 11 includes a planar rectangular upper layer 13 and a planar rectangular lower layer 15 connected by a pair of vertical sides 17 and ends 18. The upper layer 13 defines a grid of tapped holes 19 for securing scientific devices to the upper layer 13. The lower layer 15 may advantageously be provided with a number of tapped holes for the attachment of legs, support structures, optical components or other apparatus.

The structural rigidity and flatness of the table is maintained by means of a honeycomb core 21 positioned between the lower layer 15 and an intermediate layer 23. A number of debris retention structures, such as cups 25, are positioned between the intermediate layer 23 and the upper layer 13. The cups 25 include vertical sides 27 and a closed bottom 29. The sides 27 could alternatively be positioned so as to define a draft angle. These cups 25 are sufficient in number and are sized and arranged to significantly contribute to the structural support of the table. That is, loads from the upper layer 13 are transferred through the cups to the intermediate layer 23. Thus, the tabletop disclosed in the drawings includes five primary structural components: the lower layer 15, the honeycomb core 21, the intermediate layer 23, the cups 25 and the upper layer 13. The sides 17 and ends 18 may also provide significant structural support.

The components of the tabletop in this preferred embodiment will now be described in greater detail. The lower layer 15 of the tabletop includes a planar rectangular upper face 31 and a planar rectangular lower face 33. The lower face 33 is a generally exterior surface, while substantially the entire upper face 31 of the lower layer is within the interior of the tabletop 11. A first generally rectangular glue layer 35 secures the honeycomb core 21 to the upper face 31 of the lower layer 15. This glue layer 35 is preferably formed by a heat curing structural epoxy resin supplied on a film which is supported on a woven carrier or scrim. As the glue cures, the glue reticulates or wicks onto or along any closely spaced surfaces or strands of scrim. Preferably, this glue layer is a material called Redux® 609, manufactured by Ciba-Geigy of Duxford, Cambridge, England, including a woven scrim or carrier to provide handling strength to the fragile film during assembly. Those of skill in the art will recognize that other suitable glue systems could be used, such as cold curing epoxy resin systems, urethane-based glues or acrylic formulations.

The honeycomb core 21 has an upper end 37 and a lower end 39 such that the lower end 39 is secured to the first glue layer 35. The intermediate structural layer 23 has an upper face 43 and a lower face 45. The lower face 45 of the intermediate layer 23 is secured to the upper end 37 of the honeycomb core 21 by a second glue layer 41. This second glue layer 41 is preferably identical in nature to the first glue layer 35. The intermediate layer 23 includes a number of vent openings 47. These openings 47 permit the passage of air through the intermediate layer 23. These vent openings 47 prevent the creation of a partial vacuum during hot bonding of the table during manufacture, which could lead to serious problems of stability and creep both during transportation and in use. Also, these openings 47 allow the use of the table in low pressure or vacuum environments, permitting the free flow of gases throughout the entire table, thereby minimizing outgassing times.

The cups 25 have a top end 51 and a bottom end 53. The bottom end 53 of each of the cups 25 is secured to the upper face 43 of the intermediate layer 23 by means of a third glue layer 49. This glue layer 49 is preferably identical to the first and second glue layers 35 and 41, such that layer 49 covers substantially the entire upper face 43 of the intermediate layer 23. The upper layer 13 likewise has an upper face 57 and a lower face 59. The top end 51 of each of the cups 25 has a rim which is secured to the lower face 59 of the upper layer 13 by means of a fourth glue layer 61. This layer 61 is preferably identical to the other glue layers and covers substantially the entire lower face 59.

Figure 6:
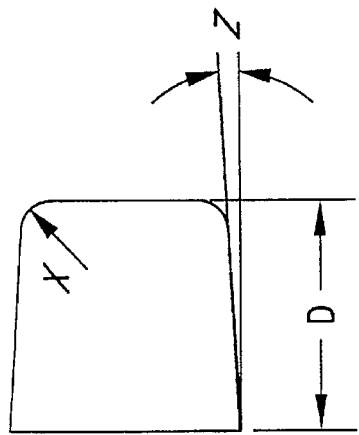
FIG. 6 is an end elevational view of the cup of FIG. 4.

As discussed above, the cups 25 have vertical sides 27 and a closed bottom or base 29. Referring to the embodiment of FIGS. 4–6, the cups may have a wall thickness T of between 0.25 and 0.7 mm. The depth D on the cups is preferably greater than 10 mm, and in one embodiment is 13 mm. Specifically, the depth of the cup should be shallow enough to allow easy cleaning, but deep enough so as to not block or hinder the use of a normally overlong screw thread used to secure objects to the table.

Figure 4:
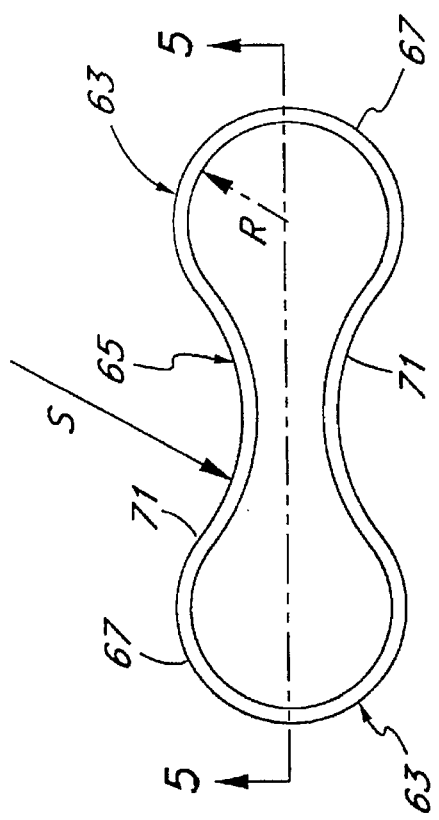
FIG. 4 is a top plan view of a cup utilized by the tabletop of FIG. 1.
Figure 5:
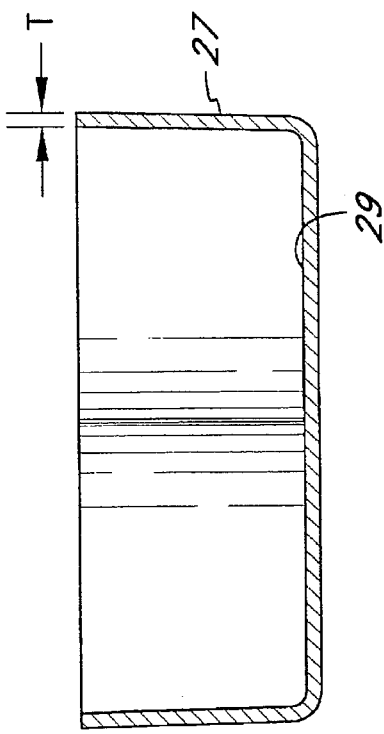
FIG. 5 is a sectional view of the cup taken along line 5—5 of FIG. 4.

As best seen in FIG. 4, in one embodiment, the horizontal cross section of the cup is generally dumbbell shaped, with a pair of larger end portions 63 and a narrower middle portion 65. The end portions 63 are preferably formed by an internally concave arcuate end wall 67, preferably having a radius R of approximately 7 mm. The middle walls are preferably formed by a pair of internally convex middle walls 71, preferably having a radius S of 13.5 mm. The bottom 29 of each cup 25 forms a complete seal with the generally vertical sides 27. Preferably, the cups 25 are of unitary construction (i.e., are formed from a single unit). Although, in the embodiment disclosed, the cups 25 comprise individual units which are not interconnected, they may be formed into plural interconnected cups from a single piece of material. To facilitate better cleaning, the vertical sides 27 of the cups may have a draft angle Z of 0°, although a draft angle between 0° and 45° may be used. In one embodiment, the vertical sides 27 and the closed bottom 29 of the cups 25 form a radius X of 1-0.5 mm. The cups 25 may be made from stainless steel, plated steel or another suitable material.

Figure 3:
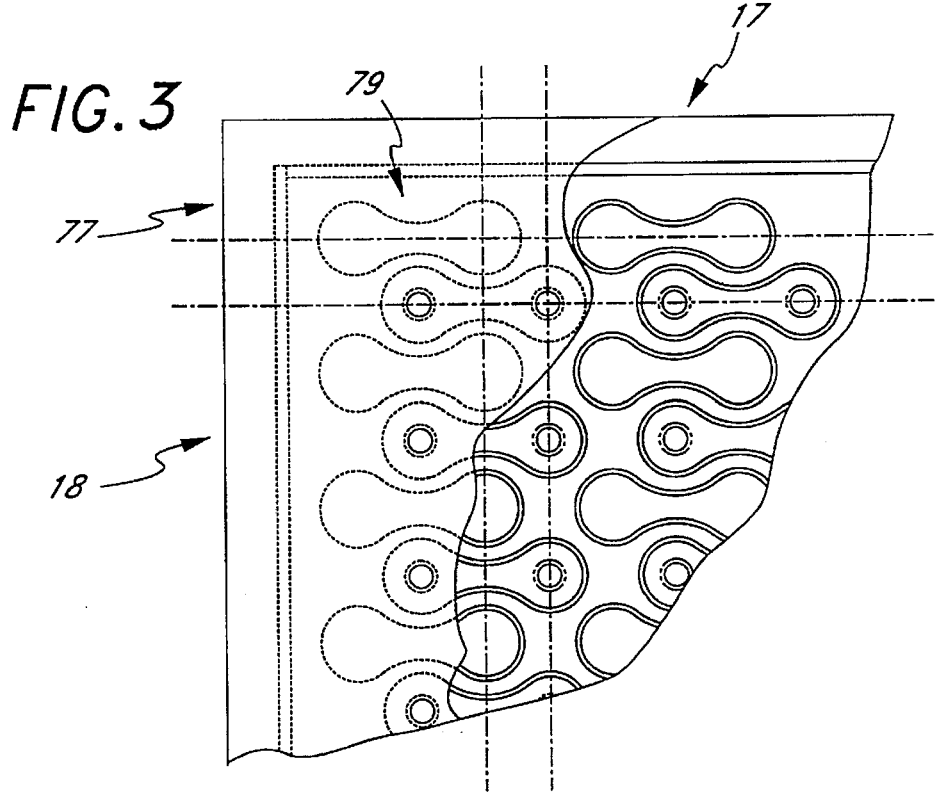
FIG. 3 is a partially cut-away top plan view of the table of FIG. 1.

As best seen in FIG. 3, the cups 25 are preferably arranged in rows 77 and columns 79 such that the center of each of the end portions 63 of the cups are coaxially aligned with the axis of the holes 19. In one embodiment, the longitudinal axis of the cups intersects the axes of the holes 19 with which the cup 25 is aligned and is parallel to the sides 17 of the table. Likewise, the columns 79 may be parallel to the ends 18 of the tabletop 11. It will be noted that in the disclosed embodiment, every other row 77 of cups 25 overlaps the previous row 77, and every other column 79 overlaps the previous column 79 for added rigidity.

The debris retention structures, such as the cups 25 are positioned to prevent contaminants from passing through the holes 19 into the honeycomb core 21 of the tabletop 11. Importantly, the cups 25 form cavities which facilitate the rapid and thorough cleaning of contaminants from the cups. Specifically, a source of suction can be connected to one of the two holes surrounded by a cup, while a source of cleaning fluid, such as a container of cleaning liquid comprising a cleaning agent, can be secured to the other of the two holes surrounded by the cup. Cleaning fluid can then be introduced, such as by pumping, from the source of cleaning fluid into the cup while simultaneously being evacuated, for example, by means of the suction applied to the other hole by the source of suction. Advantageously, the concave arcuate end walls 67 of the end portion 63 cooperate with the convex middle walls 71 to form a swirling action which will forcibly flush clean the contaminants from the cups. Of course, it would also be possible to supply cleaning fluid or suction to both holes.

Various modifications to the table may be made without affecting the cleanability of the table. For example, instead of sandwiching the cups 25 between the top and intermediate layers, the cups may be affixed to and suspended from the top layer. In such case, the intermediate layer may be replaced with a supporting structure that bridges the space between the core 21 and the top layer 13, or the honeycomb may be extended between the cups 25 to the top layer 13, such that the top layer 13 is supported directly on the core 21. Nevertheless, it is preferable to sandwich the cups 25 between the top layer 13 and the intermediate layer 23, such that the cups 25 bear the structural load of the upper layer 13 and are not suspended or nested, for example, within a separate honeycomb layer above the intermediate layer. With this arrangement, the cups need only be aligned with the tapped holes 19 of the upper layer 13, rather than with any cells formed by the honeycomb core 21. Likewise, in contrast to a number of previous designs in which a separate enclosure was required to be aligned with each of the tapped holes 19 in the upper layer 13, only half as many cups 25 need to be aligned in the present design. Alternatively, this preferred design may be modified so that each cup seals more than two holes from the honeycomb core 21. Further, although it is preferable, for optimum cleaning benefit, to generally align the centers of the end portions 63 of the cups 25 with the holes which they surround, significant swirling and cleaning benefits will still be obtained, even if the cups are not precisely aligned. Finally, as the vertical sides 27 of the cups 25 provide structural support to the upper layer 13 over a broad dumbbell-shaped area, the design should provide improved structural support for the upper layer of the tabletop. Such effect should be enhanced by the aforementioned overlapping alignment of the cups in rows and columns. Additionally, the cups, especially when they surround significantly more than two tapped holes, may be provided with upstands, such as cylindrical tubes, or other structural members to provide localized rigidity. Desirably, however, such members would define passages which would still permit the free flow of cleaning fluid throughout the cup. The debris retention structures may also be formed from tubes or sleeves. Although such tubes or sleeves would be open on both ends, the lower end would be closed by sealing the edges of the tube or sleeve against the intermediate layer. The upper end would be sealed against the top layer such that the tube or sleeve surrounds at least two tapped holes. As with the cups 25, the sides of the tubes or sleeves should be sufficiently strong to support the top layer and provide structural rigidity.

FIGS. 12 and 13, illustrate a pair of cups 311 having an alternative configuration, but being adapted for use with the table described herein. The cups 311 are sized and shaped to be positioned within the table in the same manner as the cups 25, previously described, with the exception being that the cups 311 are positioned with respect to the tapped holes 19 such that each cup is positioned beneath four tapped holes, rather than two. The cups 311 include a generally planar donut shaped bottom 313 and an inner and an outer upstanding cylindrical wall, 315 and 317, respectively. Accordingly, the inner cylindrical wall 315 defines a cylindrical opening 319. Advantageously, the cylindrical walls, 315 and 317, cooperate to create a swirling and cleaning effect when cleaning solution is pumped into the cup 311. Furthermore, as each cup 311 seals four holes 19 from the rest of the table, only half as many cups 311 are required. In other embodiments, each cup may seal a larger number of holes, for example sixteen or twenty-five.

It will be understood by those in the art that the debris retention structures, such as the cups 25, may be positioned under areas of the upper layer which do not define holes for purposes of providing local support for compressive structural loads, as well as to participate in the means by which the shear loads are communicated between the upper and lower surfaces of the table. In any event, however, it is preferable to utilize a sufficient number of debris retention structures of sufficiently small size and sufficient rigidity to prevent deformation or bowing of the upper surface of the top layer. Specifically, the table should preferably include plural debris retention structures in each of two orthogonal directions corresponding to the length and width of the table so that local support is provided at plural locations in each of these two directions. Accordingly, in the preferred embodiment, the maximum dimension of the retention structures in the plane of the top layer is substantially less than either the length or width of the top layer. Stated another way, each debris retention structure should preferably be configured so that the largest side to side dimension of its cavity is substantially less than the width of the table. Further, the sides of each debris retention structure should preferably follow a continuous closed path or loop so that the cavity formed thereby is surrounded and enclosed on all sides by the sides of the debris retention structure. In one embodiment, the peripheral length of the perimeter of the debris retention structures is significantly less than either the length or width of the table, typically an order of magnitude less.

As will also be recognized by those of skill in the art, the upper and lower layers 13 and 15 will usually be manufactured from ferromagnetic material, such as mild steel, or more normally from magnetic, martensitic stainless steel, thereby allowing the user to use magnetic clamps for attaching apparatus. Other materials such as ferrimagnetic, austenitic stainless steel or other suitable materials can be utilized. Although the upper and lower layers may be formed of dissimilar materials, in the preferred embodiment, the upper layer 13 and lower layer 15 are of the same material, so that they have matching coefficients of linear expansion in order to eliminate thermal bowing or other adverse thermal instabilities. The intermediate layer 23 may be manufactured from metal, such as steel, aluminum alloy or stainless steel.

Vertical sides 17 and ends 18 are usually formed of fixed steel sheets, which are bonded or welded to the upper and lower layers 13 and 15. Additionally, strengthening sheets 87 are desirably positioned inside of the vertical sides 17 and ends 18, extending between the upper face 31 of the lower layer 15 and the lower face 45 of the intermediate layer 23. These strengthening sheets 87 provide extra strength and allow the core to be assembled in self-contained partitions.

Those of ordinary skill in the art will also recognize that the tabletop may also include laser ports 89 or other cutouts which extend through the entire tabletop 11. Advantageously, the opening to the port in the upper layer 13 may be covered when not in use.

Finally, those of skill in the art will recognize that internal dampening material 85 will generally be incorporated within the core to reduce the peak compliance, as well as reducing the reverberation time to a few tens of a millisecond. Dampers typically employ large masses which are spring mounted together with viscus or frictional damping material or fluid. Occasionally, these dampers are not only positioned within the honeycomb core 21, but may also be secured to the vertical sides 17 and ends 18 of the tabletop.

In view of the vast number of holes in a table, typically between 3,000 and 7,000, it may also prove desirable in situations of larger spills to utilize a cleaning manifold, such as shown in FIGS. 8–11. Such a manifold may utilize a multitude of pairs of input and exit nozzles connected to sources of cleaning fluid and vacuum, respectively. This manifold may be forcefully clamped to the tabletop with its individual ports sealed to individual tapped holes by means of O-rings similar to those of the single adapters discussed above. Alternatively, the manifold may be clamped and sealed by use of a plurality of threaded screw adapters passing through the manifold by means of suitable seals sealed to that manifold. The manifold in turn can be clamped to the table by the same threaded adapters and locally sealed by one or more O-rings.

For convenience, the inlet manifold and the evacuation manifold may be joined together to form a single body having two manifold cavities, one for input fluid and one for extraction, having main input and output ports connected to appropriate tubing for the supplier to discharge a fluid, or directly to pumps for compression or suction.

Those of skill in the art will recognize that a number of sources of cleaning fluid and suction could be utilized in connection with the tabletop of the present invention. Specifically, a raised beaker could be utilized to introduce cleaning fluid into the cup. Another alternative would be to simply connect the cup to a source of cleaning fluid and reduce the pressure within the cup by providing a suction to draw cleaning fluid into the cup, thereby forcibly flush cleaning the cup with the use of only a single source of suction and without the use of a pressurized source of cleaning fluid. Likewise, it would be possible to use a single source of pressurized cleaning fluid, such as a cleaning gas comprising a cleaning agent, and flush clean the cup without collecting or sucking the fluid from the cups, relying on other means for removal or disposal of the cleaning fluid, such as evaporation, dispersion or later removal following prolonged soaking. Additionally, a fluid which contains a cleaning agent may not always be necessary, in which case ordinary air can be used as the cleaning fluid, either by drawing ambient air into the cavity by suction or by injecting compressed air into the cavity.

FIGS. 7–12 illustrate a number of preferred designs. A twin peristaltic pump 101 is utilized to force cleaning fluid 103 into the debris retention structures, such as cups 25, and to provide a vacuum 105 to extract cleaning fluid and residue therefrom. While other types of pumping systems could be used, the peristaltic pump ensures that the rate of mass throughput from the exit equals the input rate of mass throughput. The peristaltic pump is connected by tubing 107 to a cleaning fluid adapter 109 and a suction adapter 111. Advantageously, the cleaning fluid adapter 109 and the suction adapter 111 are identical. Each adapter includes a generally cylindrical body 113 having a diameter larger than the diameter of the holes to control the amount of penetration of the adapter into the hole, a proximate connecting portion 115, such as barbing for sealingly engaging the adapter to the tubing, a sealing portion 117 for sealing the adapter to the table 11, and a distal portion 119, including a mouth 121 for expelling or receiving fluid. Desirably, the sealing portion 117 is externally threaded so as to cooperate with the tapped holes 19 of the tabletop. Advantageously, the sealing portion of the adapter may also be provided with an O-ring 123 or other sealing element to provide a secondary seal between the under portion of the body 113 of the adapter and the upper face 57 of the tabletop. If desired, the adapter may further include an annular groove to act as a seat for the O-ring.

As illustrated, the distal portion 119 of the adapter desirably extends within a few millimeters of the bottom 29 of the cup 25 to ensure, in the case of the adapter 109 secured to the source of cleaning fluid 103, that the cleaning fluid is forced with significant velocity against the bottom 29 and walls 27 of the cup and, in the case of the adapter secured to the source of suction 105, that the force of suction is directly communicated to the fluid which collects at the bottom 29 of the cup 25 as the result of gravity. FIG. 7a shows an alternative embodiment of an adapter 125 in which the body 127 has a smaller diameter because the penetration of the distal end 129 of the adapter is controlled by a set of tapered threads 131 which seal with the non-tapered threads of the table holes.

Figure 8:
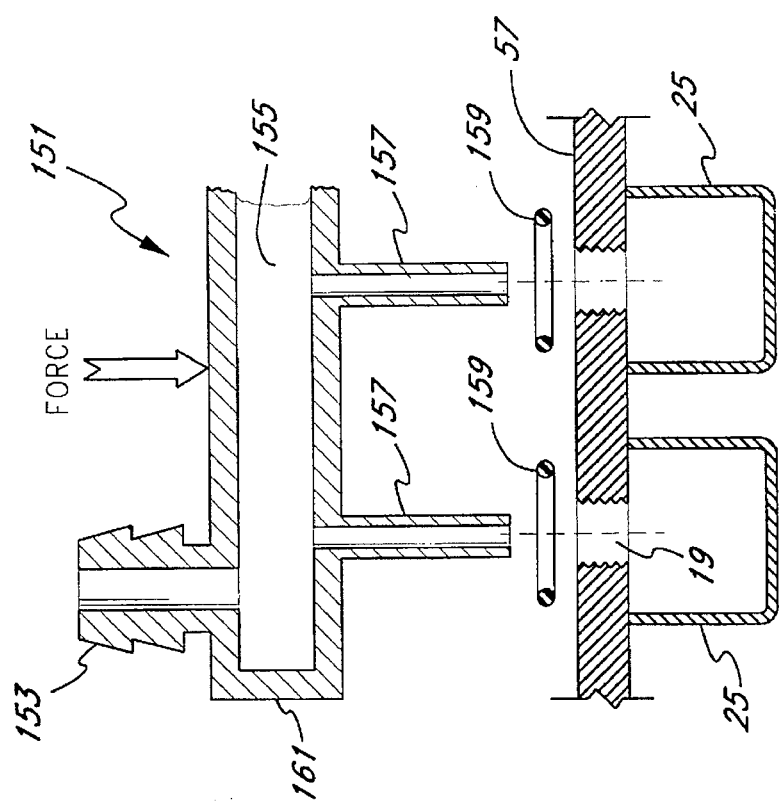
FIG. 8 is a sectional view of an alternative embodiment of a cleaning system for use with the tabletop of FIG. 1.

It would also be possible to utilize a manifold to distribute cleaning fluid to multiple debris retention structures, such as the cups, from a single source of cleaning fluid. Likewise, a manifold could be utilized to communicate suction to multiple cups from a single source of suction. Referring to FIG. 8, a manifold 151 could utilize a single nipple or connecting portion 153 for attachment to a source of vacuum and another single nipple or connecting portion (not shown) for attachment to a source of cleaning fluid. A single internal chamber 155 could then communicate the vacuum with multiple rows of cups through a series of distal portions 157 or nozzles. Similarly, a single internal chamber (not shown) could then communicate the source of cleaning fluid with multiple rows of cups through a series of distal portions or nozzles. As it would not be possible to rotate the single manifold around the multiple axes of the tapped holes 19 of the table, a seal could be established by use of an O-ring 159 and exerting a downward force on the manifold to push the body 161 of the manifold 151 against the O-rings 159 and the O-rings 159 against the upper face 57 of the table.

Figure 9:
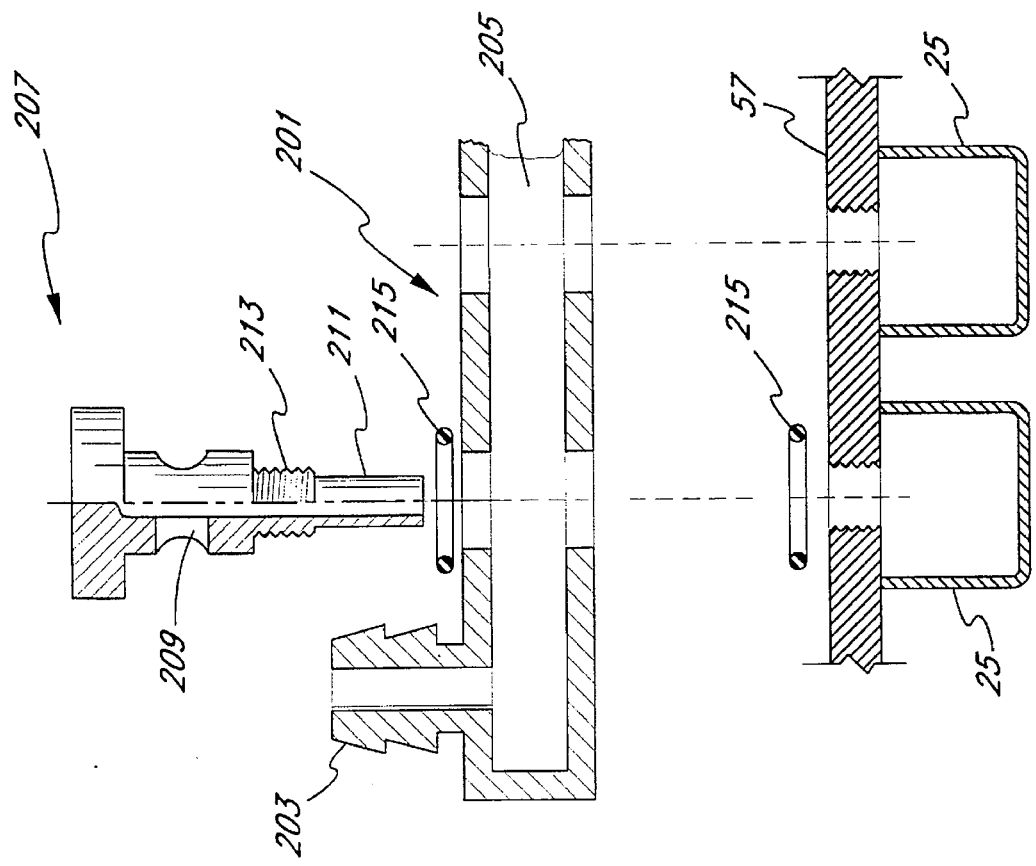
FIG. 9 is a sectional view of a second alternative embodiment of a cleaning system for use with the tabletop of FIG. 1.

Alternatively, as shown in FIG. 9, a single manifold 201 could utilize a connecting portion 203 communicating with an internal chamber 205, which could then communicate with multiple rows of cups 25 by means of removable adapters 207 which not only incorporate a fluid flow channel 209 and a distal nozzle portion 211, but which also seal the manifold 201 to the upper face 57 of the tabletop by means of an externally threaded sealing portion 213 and a pair of cooperating O-rings 215.

Figure 10:
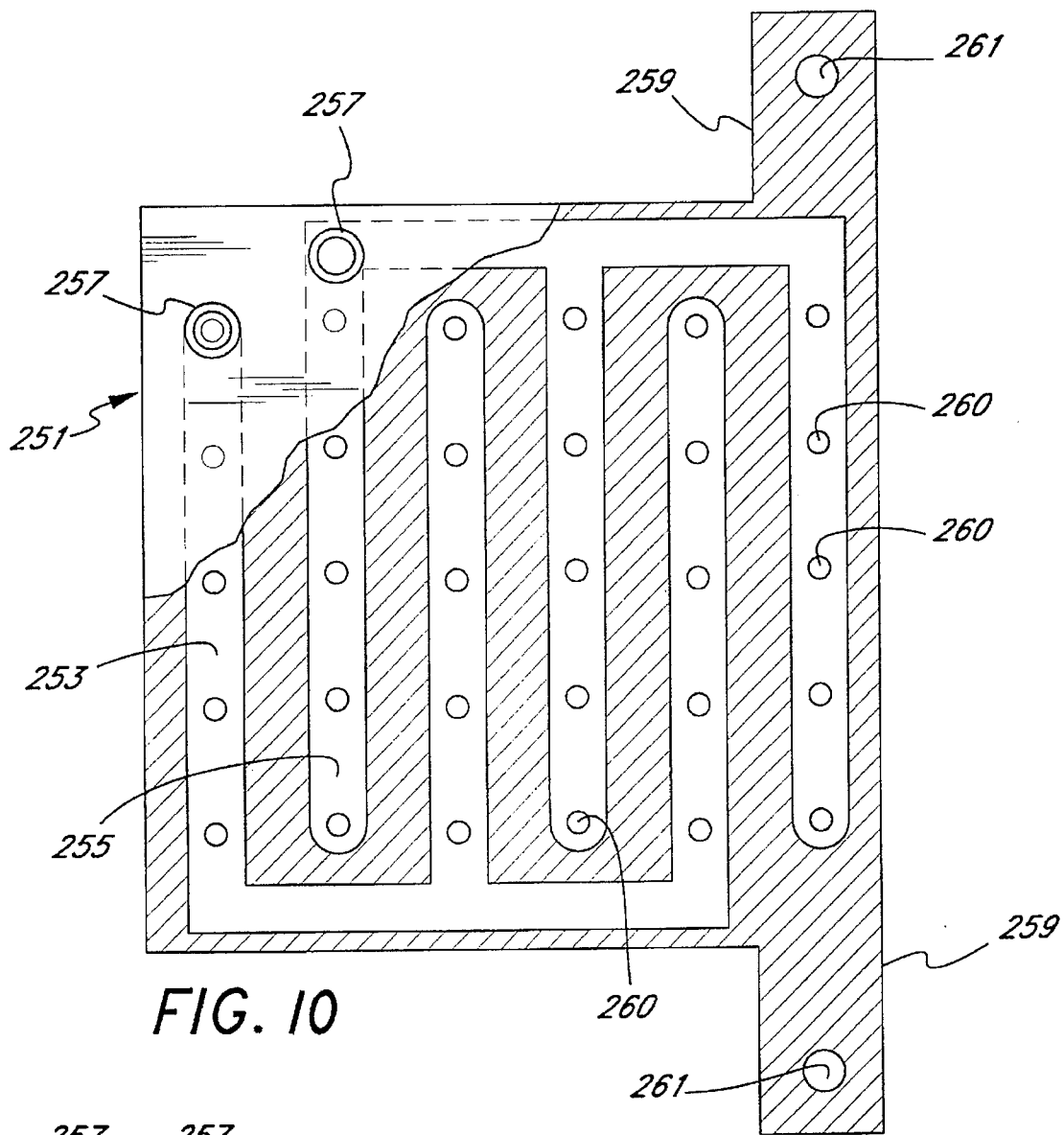
FIG. 10 is a top partial sectional view of a manifold for use with the cleaning system of the present invention.
Figure 11:
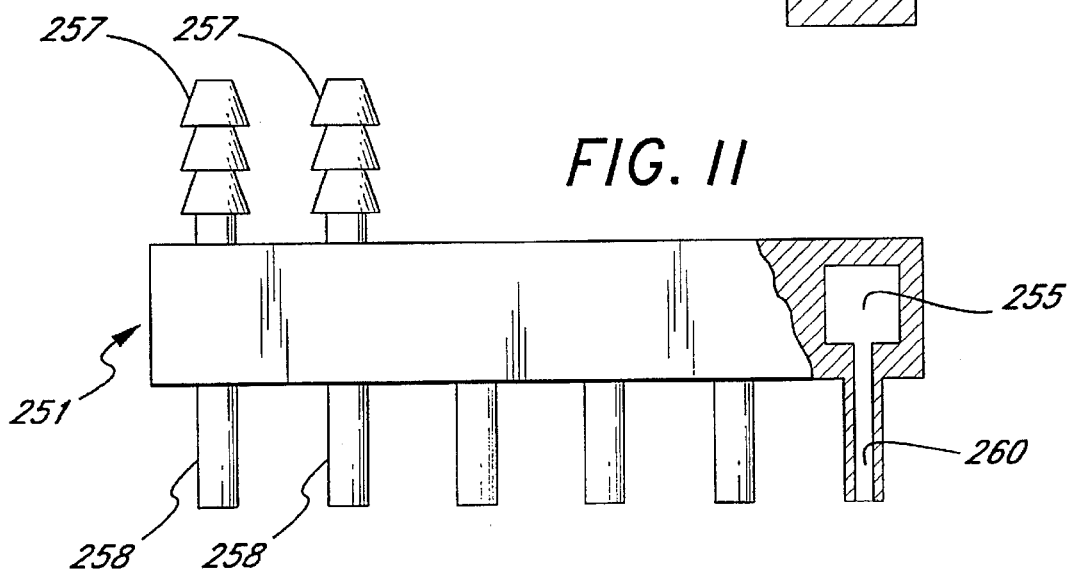
FIG. 11 is a partially cut away side elevational view of the manifold of FIG. 10.

FIGS. 10 and 11 illustrate the manner in which a manifold 251 may define a first and a second internal chamber 253 and 255, respectively. Each chamber 253 and 255, communicates with a connecting portion or nozzle 257. One nozzle may then be connected to a source of cleaning fluid, while the other nozzle is connected to a source of suction. Thus, the generally rectangular manifold forms alternating columns of cleaning fluid and vacuum. The manifold 251 illustrated is similar to that of FIG. 8 in that it is provided with integral nozzles 258, forming air flow channels 260 which communicate with the cups. However, it will be appreciated that the respective channels could similarly be utilized with a detachable adapter design. Further, the manifold is preferably provided with a pair of arms 259, each of which defines openings 261 for clamping the manifold 251 to a tabletop to form a seal.

It will be understood by those of skill in the art that where the cavity is only to be purged with inert gas, then a second vacuum source and adapter may be unnecessary. Likewise, those of skill in the art will recognize that there may be situations where the user does not want to force cleaning fluid into the cup, such as when the matter spilled is a cleaning solvent itself, such as alcohol. In such circumstances, it is likely that only suction would need to be applied.

These and various other aspects, embodiments and variations within the spirit and scope of the subject invention or equivalents thereof are apparent or will suggest themselves to those skilled in the art. Specifically, although the invention has been described in accordance with the presently preferred embodiment, it will be understood that concepts discussed herein may be embodied in various optical table designs, including those disclosed in U.S. Pat. Nos. 4,621,006, 4,645,171, 4,853,065 and French Patent No. 2,519,270, all of which are incorporated herein by reference.

Accordingly, the foregoing is intended to illustrate, but not limit, the scope of the invention.

I claim:

1. A system for cleaning a tabletop including a top structural layer having an upper face, a lower face and defining a plurality of holes, said tabletop further including a plurality of debris retention structures positioned against said lower face, each sized and shaped to surround at least two of said plurality of holes, said system comprising:

a source of cleaning fluid;

a first adapter connected to said source of cleaning fluid including a sealing portion for securing said adapter to one of said at least two of said plurality of holes to permit said source of cleaning fluid to communicate with said debris retention structure;

a source of suction; and a second adapter connected to said source of suction including a sealing portion for securing said adapter to another of said at least two of said plurality of holes to permit said source of suction to communicate with said debris retention structure, said debris retention structure forming a cavity that has a maximum dimension substantially shorter than that of said top layer.

2. The system of claim 21, wherein said source of cleaning fluid and said source of suction is a single peristaltic pump.

3. The system of claim 1, wherein said adapters are structurally connected to form a single unit.

4. The system of claim 1, comprising a plurality of said first adapters connected to a first manifold section, said first manifold section connected to receive said cleaning fluid, said first adapters arranged to introduce said cleaning fluid into respective debris retention structures.

5. The system of claim 4, comprising a plurality of said second adapters connected to a second manifold section, said second manifold connected to receive suction, said second adapters arranged to apply suction to respective debris retention structures.

6. The system of claim 4, wherein said first manifold section and said second manifold section form a single manifold.

7. The system of claim 6, further comprising means for sealing said manifold to said tabletop.

8. A system for cleaning a tabletop including a top structural layer having an upper face and a lower face, and defining a plurality of holes, said table top further including a plurality of debris retention structures positioned against said lower face, each sized and shaped to surround at least two of said plurality of holes, said system comprising:

a source of cleaning fluid;

a first adapter connected to said source of cleaning fluid including a sealing portion for securing said adapter to one of said at least two of said plurality of holes to permit said source of cleaning fluid to communicate with said debris retention structure;

a source of suction; and a second adapter connected to said source of suction including a sealing portion for securing said adapter to another of said at least two of said plurality of holes to permit said source of suction to communicate with said debris retention structure, each of said structures comprising a cup with a closed bottom and each of said adapters comprising a distal portion sized to extend into the cup in close proximity to said closed bottom of said cup.

* * * * *